June 25, 1929.　　　　K. MATSUMOTO　　　　1,718,658
EMERGENCY JACK DEVICE
Filed June 25, 1928　　　3 Sheets-Sheet 1
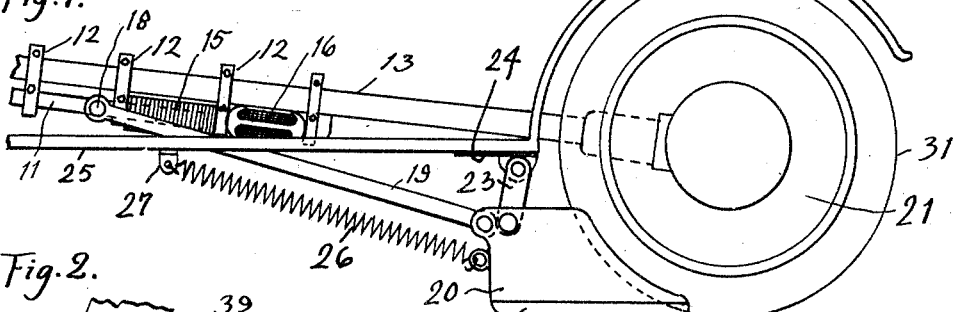
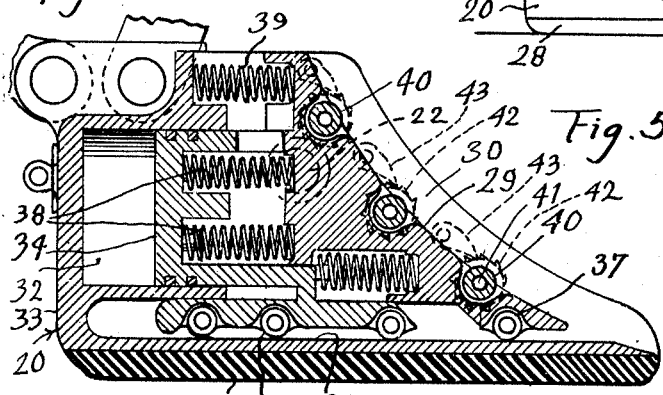
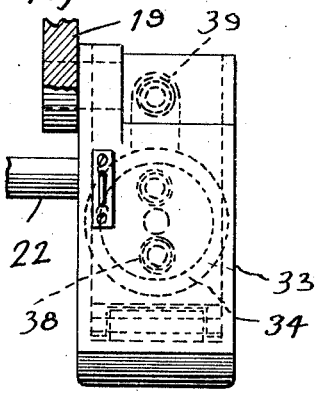
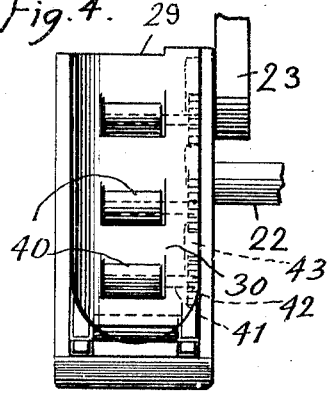
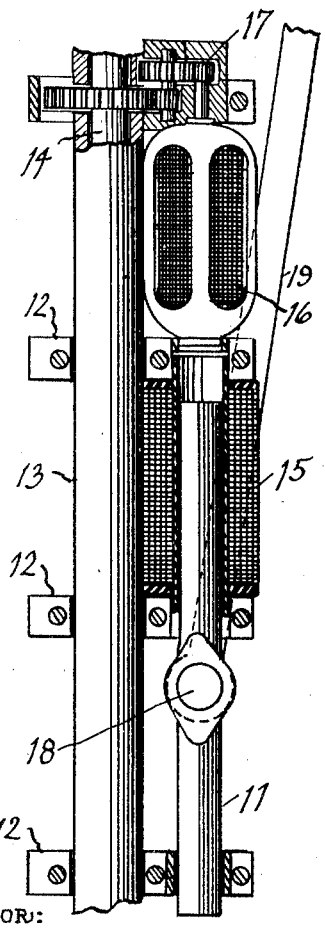
INVENTOR:
KOSAKU MATSUMOTO.
BY HIS ATTY:

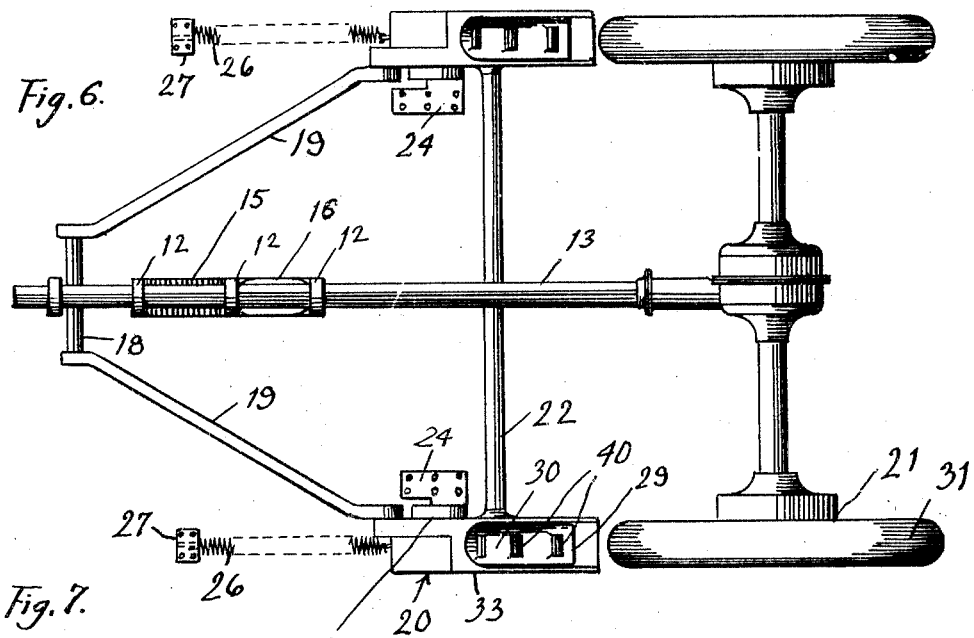
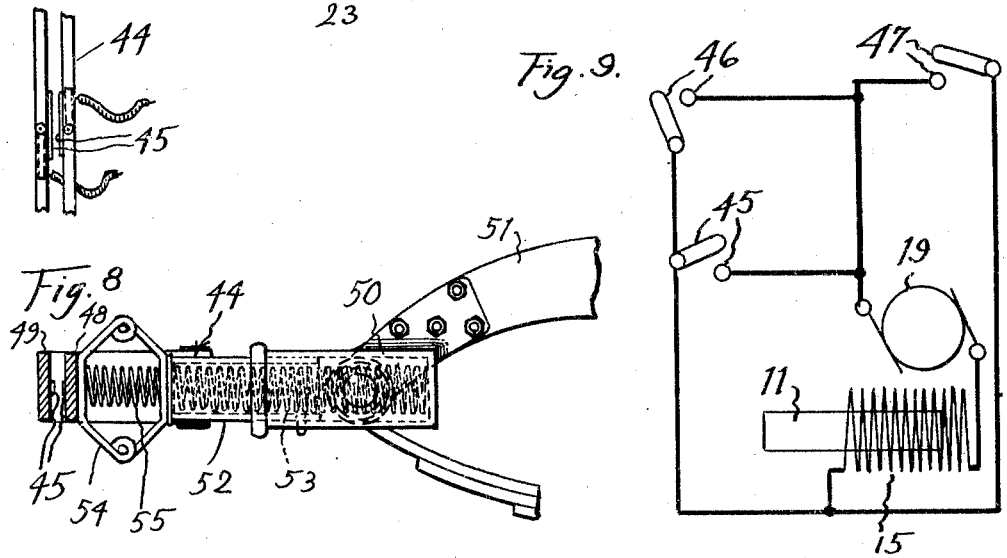

June 25, 1929.  K. MATSUMOTO  1,718,658
EMERGENCY JACK DEVICE
Filed June 25, 1928  3 Sheets-Sheet 3
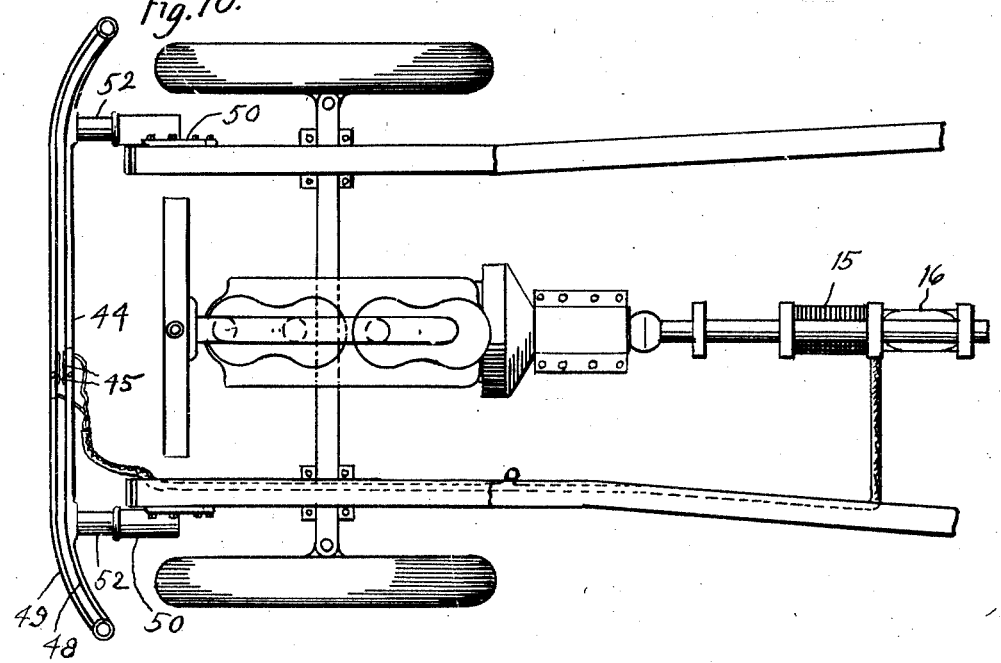
INVENTOR:
KOSAKU MATSUMOTO.
BY HIS ATTY:

Patented June 25, 1929.

1,718,658

UNITED STATES PATENT OFFICE.

KOSAKU MATSUMOTO, OF LOS ANGELES, CALIFORNIA.

EMERGENCY JACK DEVICE.

Application filed June 25, 1928. Serial No. 288,109.

This invention relates to certain new and useful improvements in emergency devices for automobiles and other vehicles, and has for its objects to provide an efficient emergency jack, which is independent of the propelling mechanism of the vehicle, and which is adapted to bring the automobile to a standstill, without injury to wheels, tires, or the propelling mechanism of the vehicle.

An object of this invention is to provide an emergency device of the character set forth, that is automatically actuated to its working position, that is positive in action, and that is always ready for immediate use.

A further object is to provide a device of the character set forth, that shifts to operative position beneath the vehicle, and that lifts the wheels from the ground, thereby causing the vehicle to skid along upon the emergency device.

A still further object of this invention contemplates the provision of means for rendering the emergency device operative through the medium of a bumper at the forward end of the vehicle and through the medium of springs, and to disengage the wheels of the vehicle from the ground, the wheels, when elevated, being adapted to continue rotation without imparting motion to the vehicle, and without injury to the propelling mechanism.

These and other objects of the invention, together with means whereby the same may be carried into effect, will be best understood from the following detail description and the drawings. It will be understood, however, that the invention may be embodied in other forms than those herein set forth without departing from the spirit and scope thereof.

In the drawings, Figure 1 is a side elevation showing an automobile wheel, a footboard, a driving shaft housing, and my emergency jack device applied thereto. Fig. 2 is a sectional elevation of a brake shoe member. Fig. 3 is a rear elevation of a brake shoe member. Fig. 4 is a front elevation of a brake shoe member. Fig. 5 is a detail view showing the operative parts that are attached to the drive shaft housing. Fig. 6 is a top plan view of the device. Fig. 7 is a fragmentary detail view of a bumper switch. Fig. 8 is a fragmentary detail and side view of a bumper switch. Fig. 9 is a wiring diagram, showing the electrical energizing circuit and elements. Fig. 10 is a top plan view of a part of the automobile chassis, showing the arrangement of certain of the electrical elements.

Referring to the drawings in detail, the device consists of a reciprocatory plunger 11, supported by brackets 12, attached to housing 13 encasing the vehicle shaft 14. Solenoid 15, supported by brackets 12, actuates plunger 11 when energized. Magneto 16, driven, through a train of gears 17, by the vehicle shaft, is adapted to energize the solenoid. Plunger 11 has a crosshead 18, which is connected by rods 19, with emergency brake shoes 20, which are adapted to be projected beneath vehicle wheels 21, and which are connected by brace rod 22, for simultaneous movement. Supporting links 23, are pivotally connected to plates 24, adapted to be secured to vehicle footboards 25, and are pivotally connected to the emergency brake shoes. The solenoids when energized, actuate the brake shoes to operative position. When released, the brake shoes are retracted to inoperative position by springs 26, which are connected to the shoes and to the eyelet members 27, fixed to the vehicle footboards 25. The springs become effective as the solenoids become inoperative.

I provide a collapsible and spring-actuated bumper 44. This bumper has an inner spring member 48, and an outer spring member 49, which carry the electric switch elements 45. The bumper has supporting brackets 50 which are attached to chassis frame elements 51, and has tubular members 52 adapted to telescope relative to members 50. I provide springs 53 interposed between members 50 and 52, and further provide auxiliary springs 54 and 55, whereby the collapsible movement of the bumper is cushioned sufficiently to protect the switch elements from injury.

The brake shoes have a rubber tread portion 28, adapted for contact with the ground, and have a working member 29, provided with groove 30 which is adapted to receive and engage with the automobile tire 31. To further avoid any shock when the device is actuated to operative position, I provide an air cylinder chamber 32 in the shoe housing 33, and a piston member 34 working in chamber 32. Piston member 34 is supported by rollers 35 in engagement with the bottom 36 of the shoe housing. Member 29 is supported by a roller 37. Springs 38 are interposed between member 29 and piston member 34, and serve to check the device when engaging with the vehicle wheel. Spring 39 is positioned between members 29 and 33.

Rollers 40 are disposed in groove 30 and project sufficiently to engage with the wheel tire 31, thereby allowing the vehicle wheel to continue its rotary movement after engaging with the shoe. Rollers 40, each have a shaft 41, and a ratchet wheel 42 on each shaft. A pawl 43 is in engagement with each wheel 42, allowing the corresponding roller to rotate in one direction only. This arrangement assists in disengaging the shoe from the wheel, and is effective to force the shoe from the wheel.

The vehicle bumper 44 is arranged with switch elements 45, adapted to be closed by the collapsing movement of the bumper, and which control a circuit between the solenoid and magneto. I further provide a foot-actuated switch 46 and a hand-actuated switch 47, all arranged for closing the energizing circuit for the solenoid.

In use, the operator will, if an emergency stop is desired, close the hand or foot-actuated switch, thereby energizing the solenoid, and actuating plunger 11. This will serve to actuate the shoes beneath the vehicle wheels. The wheels are disengaged from the ground, and rotate on rollers 40. The vehicle will then skid along, being supported by said shoes. On opening the circuit, springs 26 retract the shoes to inoperative position.

What is claimed is:

1. In an emergency jack device, ground brake shoes adapted to be projected beneath the vehicle wheels, each shoe having a housing, a rubber tread portion fixed to the housing, a working member cooperative with the housing, and having a groove to receive the vehicle wheel, said housing having an air cylinder chamber, a piston member working in the air cylinder chamber, springs interposed between the piston member and said grooved working member, rollers operative on the bottom portion of the housing and supporting the piston member, and other rollers disposed in and projecting in said groove, and arranged to support the vehicle wheel and to rotate in one direction.

2. In an emergency jack device, ground brake shoes adapted to be projected beneath the vehicle wheels, each shoe comprising a housing, a tread portion of rubber fixed to the bottom of the housing, said housing having an air cylinder chamber, a piston member working in the air cylinder chamber, a working member disposed adjacent to the piston member, and having a groove adapted to receive the vehicle wheel, springs interposed between the piston member and working member, rollers projecting in the bottom of said groove, and ratchet elements serving to prevent rotation of the rollers in one direction.

In testimony whereof, I hereunto affix my signature.

KOSAKU MATSUMOTO.